United States Patent
Kato

(10) Patent No.: US 7,591,987 B1
(45) Date of Patent: Sep. 22, 2009

(54) METHOD AND APPARATUS FOR TREATING AMMONIA-CONTAINING GAS

(75) Inventor: Yasuyoshi Kato, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 109 days.

(21) Appl. No.: 10/579,368

(22) PCT Filed: Nov. 12, 2004

(86) PCT No.: PCT/JP2004/016868

§ 371 (c)(1),
(2), (4) Date: Jan. 17, 2007

(87) PCT Pub. No.: WO2005/046844

PCT Pub. Date: May 26, 2005

(30) Foreign Application Priority Data

Nov. 14, 2003 (JP) .............................. 2003-385245

(51) Int. Cl.
*B01D 53/54* (2006.01)
*B01D 53/56* (2006.01)
*B01D 53/58* (2006.01)
*B01D 53/74* (2006.01)
*B01D 53/86* (2006.01)

(52) U.S. Cl. ................. 423/237; 423/239.1; 423/239.2; 422/168; 422/169; 422/170; 422/171; 422/177; 422/180; 422/181

(58) Field of Classification Search ................. 423/237, 423/239.1, 239.2; 422/168–171, 177, 180, 422/181
See application file for complete search history.

(56) References Cited

U.S. PATENT DOCUMENTS

| 5,409,681 A | * | 4/1995 | Kato et al. ................ 423/239.1 |
| 5,746,052 A | * | 5/1998 | Kinugasa et al. .............. 60/274 |
| 2007/0148136 A1 | * | 6/2007 | Whitlock ................... 424/93.4 |

FOREIGN PATENT DOCUMENTS

| JP | 52-100365 | 8/1977 |
| JP | 56-065621 | 6/1981 |
| JP | 5-146634 | 6/1993 |
| JP | 2000 317272 | 11/2000 |

OTHER PUBLICATIONS

International Search Report dated Dec. 28, 2004 corresponding to International Application No. PCT/JP2004/016868.

* cited by examiner

*Primary Examiner*—Timothy C Vanoy
(74) *Attorney, Agent, or Firm*—Fay Sharpe LLP

(57) ABSTRACT

A method for treating an ammonia ($NH_3$)-containing gas, which comprises causing the $NH_3$-containing gas to pass through a catalyst tower (9) firstly with a pre-treatment catalyst layer (1) having, in parallel, a flow path involving a catalyst layer having the function of oxidizing $NH_3$ to form NO and a flow path involving a catalyst layer not having the above function, and then, contacting the resultant gas with a catalyst layer (2) having in combination, the denitration function and the function of oxidizing $NH_3$ to form NO; and an apparatus for practicing the method.

9 Claims, 3 Drawing Sheets

1: PRE-TREATMENT CATALYST LAYER
2: NH₃ DECOMPOSITION CATALYST LAYER
9: CATALYST TOWER
14: GAS TO BE TREATED (A)   (B)   (C)

1: PRE-TREATMENT CATALYST LAYER
3: CATALYST LAYER HAVING NH₃ OXIDATION COMPONENT
4: CATALYST LAYER NOT HAVING NH₃ OXIDATION COMPONENT

1: PRE-TREATMENT CATALYST LAYER

2: NH₃ DECOMPOSITION CATALYST LAYER

5: PREHEATER

6: STRIPPING TOWER

7: CARRIER GAS

8: DILUENT AIR

9: CATALYST TOWER

10: NEUTRALIZATION TANK

11: PUMP

13: TREATED GAS

2: NH₃ DECOMPOSITION CATALYST LAYER

9: CATALYST TOWER

12: NOBLE METAL-BASE OXIDATION CATALYST LAYER

14: GAS TO BE TREATED

METHOD AND APPARATUS FOR TREATING AMMONIA-CONTAINING GAS

This application is a national stage filing under 35 U.S.C. § 371 of International Application Number PCT/JP04/16868 filed on Nov. 12, 2004.

TECHNICAL FIELD

A method for treating an ammonia ($NH_3$)-containing gas to clarify the gas, which comprises causing the $NH_3$-containing gas to pass through a catalyst tower (9) firstly with a pre-treatment catalyst layer (1) having, in parallel, a flow path involving a catalyst layer having the function of oxidizing $NH_3$ to form NO and a flow path involving a catalyst layer not having the above function, and then, contacting the resultant gas with a catalyst layer (2) having in combination, the denitration function and the function of oxidizing $NH_3$ to form NO; and an apparatus for practicing the method. The method allows the treatment of a gas containing $NH_3$ in a high concentration with good efficiency, without the thermal deterioration of the catalyst layer (2).

BACKGROUND ART

Large quantities of an exhaust gas and waste water containing $NH_3$ are discharged from a variety of industrial plants such as semiconductor factories, resulting in a variety of bad effects such as odor environmental pollution, and deterioration of water quality. Particularly, in recent years, eutrophication of sea water such as generation of red tides due to $NH_3$ contained in industrial waste water becomes a social problem; and in this respect, laws for severely restricting $NH_3$ concentration in waste water are going to be developed. For this reason, a variety of studies and developments are made on a technology for defusing $NH_3$; and the following technologies are going to become mainstreams as a treating technology for exhaust materials containing $NH_3$.

Namely, a method for catalytically oxidizing $NH_3$ with a catalyst is known as a technology for decomposing $NH_3$ in a vapor phase, while a method for catalytically oxidizing $NH_3$ by using the above-mentioned catalyst after transferring $NH_3$ in waste water to a vapor phase in an aeration tower or a stripping tower is known as a technology for decomposing $NH_3$ contained in industrial waste water. These technologies are ones drawing attention as a method for using a multifunctional catalyst having a denitration function due to a denitration active component and a function of oxidizing $NH_3$ to form a nitrogen oxide (NOx) due to a noble metal component in combination in the catalyst, whereby, several % of $NH_3$ may be converted efficiently into harmless nitrogen ($N_2$), for example.

Patent document 1: Japanese Patent Application Laid-Open No. 5-146634

Patent document 2: Japanese Patent Application Laid-Open No. 2000-317272

DISCLOSURE OF THE INVENTION

Problems to be Solved by the Invention

However, the above-described prior art involves such problems that a catalyst itself is deteriorated thermally due to oxidative reaction heat of $NH_3$, and that a reaction to generate nitrogen monoxide (NO) from $NH_3$ proceeds excessively due to temperature rise in a catalyst layer in the case where an $NH_3$ concentration in an exhaust gas or an $NH_3$ concentration transferred to a gas is high. More specifically, there have been such problems that when an $NH_3$ gas of a high concentration contained in an exhaust gas is made to be harmless by means of a tube reactor filled with a multifunction catalyst (hereinafter referred to as "$NH_3$ decomposition catalyst"), oxidation heat of $NH_3$ concentrates in an inlet part of the catalyst to reduce a life of the catalyst, and that a denitration function becomes unbalanced with respect to a function of generating NO from $NH_3$, whereby large quantities of by-products such as NOx are produced due to temperature rise by reaction heat.

In order to avoid such problems, a method in which a publicly known high heat-resistant noble metal-base oxidation catalyst layer 12 is disposed on the upstream side of an $NH_3$ decomposition catalyst layer 2 as shown in FIG. 5 to convert in advance a part of $NH_3$ into NOx, and then the resultant gas is introduced into the above-described $NH_3$ decomposition catalyst layer 2 has been proposed. In the method, however, there arises such a problem that an $NH_3$ oxidation reaction due to the above-described noble metal-base oxidation catalyst layer 12 is thermally run away by means of reaction heat to by-produce a large quantity of NOx in the case where an $NH_3$ concentration is high in the exhaust gas. Furthermore, the method involves also such fear that a ratio of $NH_3$ to be decomposed in advance varies excessively when a gas flow rate and an $NH_3$ concentration change, so that the $NH_3$ cannot perfectly be decomposed in the downstream part.

An object of the present invention is to eliminate the problems involved in the above-described prior art and to provide a method and an apparatus for treating an $NH_3$-containing gas by which $NH_3$ contained in a high concentration in an exhaust gas can be efficiently decomposed and treated to be converted into a harmless gas without causing the deterioration of a catalyst and the increase in production of by-products.

Means for Solving the Problems

The above-described problems can be solved by such a method that a gas containing $NH_3$ of a high concentration is allowed to pass through a pre-treatment catalyst layer composed of a catalyst layer having a function of oxidizing in advance $NH_3$ to generate NOx and another catalyst layer not having such function as described above disposed in parallel thereto, and then the resultant gas is allowed to be in contact with an $NH_3$ decomposition catalyst layer having a denitration function, i.e. a function for catalytically reducing a nitrogen oxide and a function for oxidizing $NH_3$ to generate NOx in combination.

Namely, the inventions of this application are as follows.

(1) A method for treating an $NH_3$-containing gas, characterized by passing the ammonia ($NH_3$)-containing gas through a pre-treatment catalyst layer provided with a catalyst layer having a function for oxidizing $NH_3$ to generate nitrogen monoxide (NO) and another catalyst layer not having the former function in parallel, and then passing the resultant gas through a catalyst layer having a denitration function in combination with a function for oxidizing $NH_3$ to generate NO.

(2) The method according to the paragraph (1), wherein that a part of a flow path section is provided with a catalyst layer containing an $NH_3$ oxidation active component selected from zeolite, silica, titania, zirconia and alumina supported with platinum (Pt), palladium (Pd), or Rhodium (Rh); and another part of the flow path section is provided with a catalyst layer not containing the $NH_3$ oxidation active component, to form the pre-treatment catalyst layer.

(3) The method according to the paragraph (1) or (2), wherein the catalyst having the denitration function in combination with the function for oxidizing $NH_3$ to generate NO contains titanium oxide ($TiO_2$); an oxide of at least one of vanadium (V), tungsten (W) and molybdenum (Mo); and zeolite, titania, alumina, or zirconia supported with platinum (Pt).

(4) The method according to any one of the paragraphs (1) to (3), wherein a feed amount of the $NH_3$-containing gas to a flow path of the catalyst layer having the function for oxidizing $NH_3$ to generate NO in the pre-treatment catalyst and a flow path of the catalyst layer not having the former function is controlled such that an $NH_3$ concentration in the gas treated in the pre-treatment catalyst layer is higher than a NOx concentration.

(5) The method according to any one of the paragraphs (1) to (4), wherein the $NH_3$-containing gas is the gas after transferring the $NH_3$ in waste water to a vapor phase.

(6) An apparatus for treating an $NH_3$-containing gas in which a pre-treatment catalyst layer having a function for oxidizing $NH_3$ to generate carbon monoxide (NO), and a catalyst layer having a denitration function in combination with another function for oxidizing $NH_3$ to generate NO are sequentially disposed in a flow path section of a gas containing ammonia ($NH_3$) along the gas flow direction, characterized in that a part of the flow path section is composed of a catalyst layer containing an $NH_3$ oxidation active component selected from zeolite, silica, titania, zirconia, alumina and the like supported with platinum (Pt), palladium (Pd), or Rhodium (Rh); and another part of the flow path section is composed of a catalyst layer not containing the $NH_3$ oxidation active component in the pre-treatment catalyst layer.

(7) The apparatus according to the paragraph (6), wherein a ratio of the catalyst layer containing the $NH_3$ oxidation active component to the catalyst layer not containing the oxidation component in the pre-treatment catalyst layer is decided such that the $NH_3$ concentration in the outlet gas of the pre-treatment catalyst layer is higher than a NOx concentration in the outlet gas.

(8) A pre-treatment catalyst used in the apparatus according to the paragraph (6) or (7), wherein a part of the flow path section is composed of a catalyst layer containing an $NH_3$ oxidation active component selected from zeolite, silica, titania, zirconia and alumina supported with platinum (Pt), palladium (Pd), or Rhodium (Rh); and another part of the flow path section is composed of a catalyst layer not containing the $NH_3$ oxidation active component.

EFFECT OF THE INVENTION

According to a first aspect of the present application, an $NH_3$ concentration in the gas flowing into the $NH_3$ decomposition catalyst layer on the downstream side can be reduced to a concentration suitable for an $NH_3$ decomposition reaction in the $NH_3$ decomposition catalyst layer by means of the pre-treatment catalyst layer on the upstream side. Thus, even a gas containing $NH_3$ of a high concentration can be efficiently treated without accompanying thermal deterioration of the catalyst layer and without increasing production of NOx as a by-product.

According to a second aspect of this application, in addition to the above-described advantageous effect of the invention, an $NH_3$ concentration in an exhaust gas can be reduced to a concentration in which the exhaust gas can be treated in the $NH_3$ decomposition catalyst layer on the downstream side by means of the pre-treatment catalyst, a part of the flow path of which is composed of the catalyst layer containing an oxidation active component supported with a noble metal.

According to a third aspect of this application, in addition to the above-described advantageous effects of the invention, the $NH_3$ in the $NH_3$-containing gas with the concentration thereof reduced to a predetermined concentration may be efficiently decomposed and treated by balancing the denitration function with the function for oxidizing $NH_3$ to generate NO by using the $NH_3$ decomposition catalyst layer containing a predetermined metal and a noble metal.

According to a fourth aspect of this application, in addition to the above-described advantageous effects of the invention, the $NH_3$ concentration in the outlet gas of the pre-treatment catalyst layer may be increased efficiently to be higher than the NOx concentration.

According to a fifth aspect this application, even waste water containing an $NH_3$ of a high concentration can be efficiently decomposed to be made harmless after transferring the $NH_3$ in the waste water to a vapor phase, in addition to the above-described advantageous effects of the invention.

According to a sixth aspect of this application, an $NH_3$ concentration in the gas flowing into the $NH_3$ decomposition catalyst layer on the downstream side can be reduced to a concentration suitable for a treatment in the $NH_3$ decomposition catalyst layer, and hence, an $NH_3$-containing gas of a high concentration can be efficiently treated without employing diluent air, water vapor or the like, or with employing a quantity consumed thereof reduced to the utmost.

According to seventh and eight aspects of this application, a part of the $NH_3$ contained in an exhaust gas can be oxidized efficiently to NO.

Based on FIG. 3, the principle of the present invention will be described.

FIG. 3 is a graphical representation showing examples of temperature dependency of $NH_3$ oxidation ratio due to a noble metal supported catalyst such as Pt, Pd, and Rh in the case where an $NH_3$ concentration is high (thick line) and the case where the $NH_3$ concentration is low (thin line).

An $NH_3$ oxidation reaction in the presence of a noble metal supported catalyst is represented by the following formula 1; and the reaction accompanies remarkable exothermic heat.

$$NH_3 + 5/4 O_2 \rightarrow NO + 3/2 H_2O \qquad \text{(Formula 1)}$$

Thus, when an $NH_3$ concentration is high, a temperature of the processed gas rises due to oxidation reaction, whereby the reaction speed becomes faster, so that changes in the $NH_3$ oxidation ratio exhibit a rapid rising characteristic shown by the thick line in FIG. 3. Since there is such a rapid rising characteristic, the $NH_3$ oxidation ratio changes to a value close to either 0% or 100% due to a slight change in the inlet temperature, the $NH_3$ concentration or a gas amount. Accordingly, as in the prior art mentioned above, even if such treatment that a noble metal-base oxidation catalyst layer is disposed on the upstream side of the $NH_3$ decomposition catalyst layer to oxidize partially the $NH_3$ in a previous stage, whereby the $NH_3$ concentration is reduced, and then the resultant gas is introduced into the $NH_3$ decomposition catalyst layer is intended to apply, most of the $NH_3$ is oxidized to NOx by means of the noble metal-base oxidation catalyst layer in the upstream part. Hence, there arises such a problem that the NOx is discharged in an untreated condition to the outside of the system.

On the other hand, according to the present invention, a catalyst layer having a function for oxidizing $NH_3$ to generate NO, i.e. a catalyst layer supported with a noble metal catalyst and a catalyst layer supported with no noble metal catalyst have structures in which a catalyst layer 3 containing $NH_3$ oxidation component and another catalyst layer 4 not containing the oxidation component exist mixedly as shown in each sectional structure of, for example, FIGS. 2(A), 2(B), and 2(C) in a pre-treatment catalyst layer. Under the circumstances, even when substantially 100% oxidation of $NH_3$ arises in the catalyst layer 3 supported with a noble metal catalyst, the $NH_3$ passing through the catalyst layer 4 supported with no noble metal catalyst remains in an undecomposed condition. Accordingly, when each ratio of gas amounts passing through the catalyst layer supported with the noble metal component and the catalyst layer supported with no noble metal component (a ratio of catalyst flow paths occupying the respective sections) is selected, $NH_3$ of a high concentration can be oxidized partially in a desirable ratio. As described above, when a gas to be treated has been previously passed through the pre-treatment catalyst to reduce an $NH_3$ concentration in the gas flowing into the $NH_3$ decomposition catalyst layer on the downstream side, $NH_3$ in the gas can be efficiently decomposed without causing the $NH_3$ decomposition catalyst to have an abnormal high temperature. In this case, it is preferred to adjust the condition such that an $NH_3$ concentration is higher than a NOx concentration. Thus both the concentrations of the $NH_3$ and the NOx can be reduced down to several ppm or less by means of synergistic actions of denitration reaction and $NH_3$ oxidation reaction inside the catalyst. These reactions are represented by the following formulae 2 and 3.

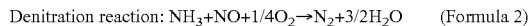

Denitration reaction: $NH_3 + NO + 1/4 O_2 \rightarrow N_2 + 3/2 H_2O$   (Formula 2)

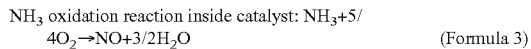

$NH_3$ oxidation reaction inside catalyst: $NH_3 + 5/4 O_2 \rightarrow NO + 3/2 H_2O$   (Formula 3)

EXPLANATION OF REFERENCE NUMERALS

| | |
|---|---|
| 1 | Pre-treatment catalyst layer |
| 2 | $NH_3$ decomposition catalyst layer |
| 3 | Flow path having $NH_3$ oxidation component |
| 4 | Flow path not having $NH_3$ oxidation component |
| 5 | Preheater |
| 6 | Stripping tower |
| 7 | Carrier gas |
| 8 | Diluted air |
| 9 | Catalyst tower |
| 10 | Neutralization tank |
| 11 | Pump |
| 12 | Noble metal-base oxidation catalyst layer |
| 13 | Treated gas |
| 14 | Gas to be treated |

BEST MODE FOR CARRYING OUT THE INVENTION

Figure 1:
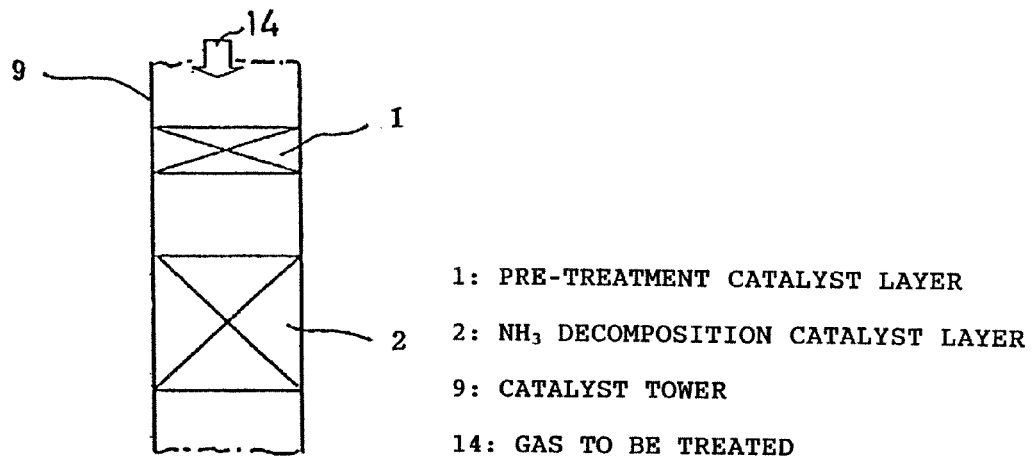
FIG. 1 is a diagram showing a basic configuration of an $NH_3$-containing gas purifier applied to the present invention.

FIG. 1 is an explanatory diagram showing an $NH_3$-containing gas purifier as an example of the present invention. In FIG. 1, a pre-treatment catalyst layer 1 composed of a flow path of a catalyst layer having a function for oxidizing $NH_3$ to generate NO and another flow path of a catalyst layer not having the former function, and an $NH_3$ decomposition catalyst layer 2 having a denitration function and a function for oxidizing $NH_3$ to generate NO in combination are disposed along the direction of a gas flow in a catalyst tower 9.

In the structure as described above, a high concentration $NH_3$-containing gas as a gas to be treated 14 flows into the pre-treatment catalyst layer 1, and a part of the gas passes through the catalyst layer having the function for oxidizing $NH_3$ to generate NO, whereby a part of the $NH_3$ is converted into NO, while the $NH_3$ in the gas passing through the catalyst layer not having the function for oxidizing $NH_3$ is not oxidized, and passes through the pre-treatment layer 2. In this manner, the gas in which a part of the $NH_3$ is oxidized to generate NO and the $NH_3$ concentration thereof becomes suitable for the treatment in the downstream $NH_3$ decomposition catalyst layer 2 flows into the $NH_3$ decomposition catalyst layer 2, wherein the resultant gas is treated by the synergistic action of the denitration reaction and the $NH_3$ oxidation reaction described above, so that both of the $NH_3$ and NO concentrations are reduced down to several ppm or less.

According to the present example, since the pre-treatment catalyst layer 1 is provided with the catalyst layer containing a noble metal component and having the $NH_3$ oxidizing function, and the catalyst layer not having the former function in combination as described above, the $NH_3$ concentration can be reduced down to a concentration suitable for the treatment in the downstream $NH_3$ decomposition catalyst layer 2 after decomposing partially the $NH_3$ in the gas to be treated, even if the condition varies within a certain extent. In other words, since the pre-treatment catalyst layer 1 is combined with the $NH_3$ decomposition catalyst layer 2, no unnecessary NO is by-produced, and $NH_3$ may be efficiently decomposed and treated.

In addition, according to the present example, an $NH_3$-containing gas of a high concentration, which had been hardly treated in a conventional technology because of deterioration of the catalyst and production of NOx, can be removed highly efficiently without by-producing the NOx. Accordingly, amounts of air and water vapor required heretofore for diluting the $NH_3$ concentration down to that being treatable may be reduced remarkably, so that the running cost can be reduced. Besides, there are an advantageous effect of preventing deterioration of a catalyst due to reaction heat based on abnormal heating and another advantageous effect of being hardly affected by variations in the operation condition.

In the present invention, the expression "pre-treatment catalyst layer composed of the catalyst layer having the function for oxidizing $NH_3$ to generate NOx and another catalyst layer not having the former function" means a catalyst layer made of a catalyst body (honeycomb catalyst) having a configuration constructed such that each flow path forms a single flow path communicating from the inlet to the outlet such as a honeycomb made of ceramics, for example, cordierite and the like; and a corrugate honeycomb made from an inorganic fiber nonwoven fabric, a metal sheet and the like. A part of its flow path section is composed of the catalyst body containing an $NH_3$ oxidation active component made of zeolite, silica, titania, zirconia, alumina or the like supported with platinum (Pt), palladium (Pd), or rhodium (Rh), while a part of another flow path section is composed of another catalyst body not containing the above-described $NH_3$ oxidation active component.

Figure 2:
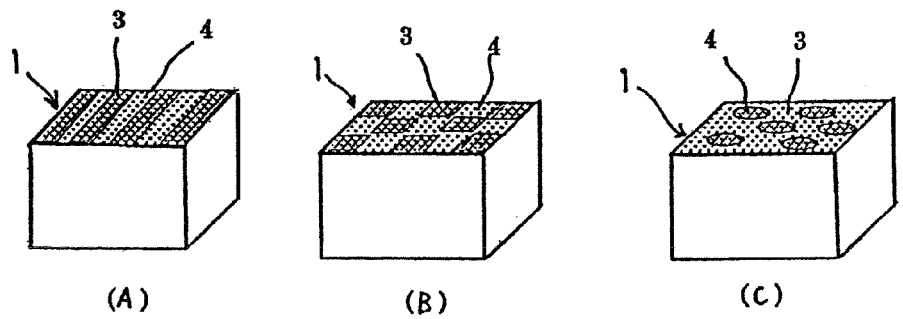
FIGS. 2(A), (B), and (C) are views each showing a structural example of a pre-treatment catalyst layer applied to the present invention.
Figure 3:
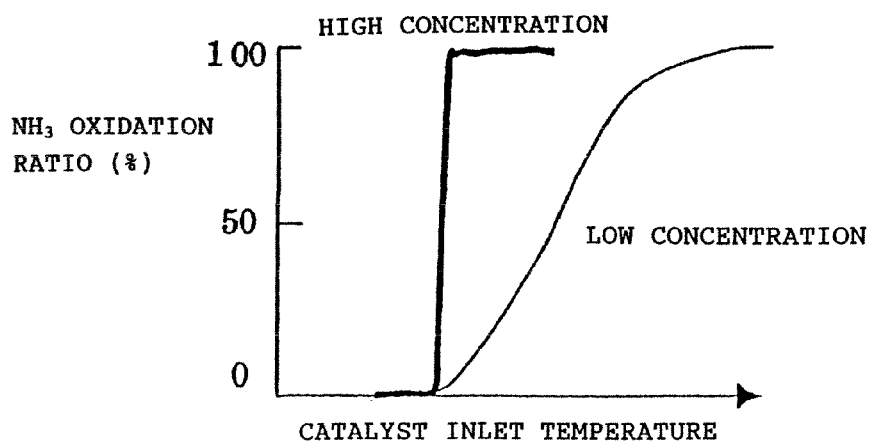
FIG. 3 is a complemental representation for explaining the principle of the present invention.

Any configured arrangement may be applied as to a flow path area of the catalyst layer containing the oxidation active component and another flow path area of the catalyst layer not containing the oxidation active component. For instance, a flow path area on which a catalyst component is supported in a configuration such as a striped pattern, a staggered pattern, a sea-island pattern and the like as shown in FIGS. 2(A), 2(B), and 2(C) is preferably used. In case of forming the flow path of the catalyst layer containing a noble metal catalyst component and another flow path of the catalyst layer not containing the noble metal catalyst component, when the number of divided regions is increased, $NH_3$ oxidation reaction heat may be escaped from the flow path containing the noble metal catalyst to the flow path not containing the noble metal catalyst. Thus, it may further prevent deterioration of the catalyst due to an abnormal temperature rise in an inlet part of the catalyst.

In the present invention, although there is no limitation as to a support amount of a noble metal as an oxidation active component in the pre-treatment catalyst layer, a preferable result can be obtained within the range of from 0.05 wt % to 10 wt % with respect to a carrier such as zeolite, and silica. On the other hand, a larger support amount of the noble metal as to an exhaust gas flow path is desirable, but increase in the support amount of such noble metal results in the price increase, and hence, the support amount is, for example, 0.01 g/liter or more, and preferably 0.1 g to 2 g/liter of the flow path.

In the present invention, the $NH_3$ decomposition catalyst having the denitration function and the function for oxidizing $NH_3$ to generate NOx in combination may be, for example, a catalyst prepared by introducing thinly zeolite or porous silica on which Pt has been supported as a noble metal component into a mixture containing a titanium (Ti) oxide as the major component and a vanadium (V) oxide as an active component for the denitration catalyst component, which is disclosed in Japanese Patent Application Laid-Open Nos. 5-146634 and 2000-317272. More specifically, the catalyst may be the one composed of a composition consisting of oxides of at least one or more elements selected from titanium, vanadium, tungsten and molybdenum as a first component, and another composition being either salts of a noble metal selected from platinum, palladium, and rhodium or a material containing any of the above-described noble metals which has been previously supported on a porous material such as zeolite, alumina, and silica as a second component. A configured arrangement of the $NH_3$ decomposition catalyst may be the same as that of the pre-treatment catalyst, for example, in which a variety of honeycomb-shaped carrier is supported with a catalyst component in accordance with a publicly known method. In this respect, however, the invention is not particularly limited to that described above, but any configured arrangement such as a stacked layer body of plate-like catalyst is applicable.

In the present invention, a control for a supply amount of the $NH_3$-containing gas to the flow path of the catalyst layer having the function for oxidizing $NH_3$ to generate NO and another flow path of the catalyst layer not having the former function in the pre-treatment catalyst layer is carried out in accordance with a manner in which a ratio of existence of both the catalyst layers in their flow path parts is adjusted such that the $NH_3$ concentration in the outlet gas of the pre-treatment catalyst layer is higher than the NOx concentration. In this case, when a ratio of $NH_3$ corresponding to an amount of $NH_3$ which has been intended to be previously oxidation-decomposed in the pre-treatment catalyst layer is selected to become equal to a ratio occupied by the flow path of the catalyst layer having oxidation activity with respect to the whole gas flow path, the desired result is easily obtained.

Figure 4:
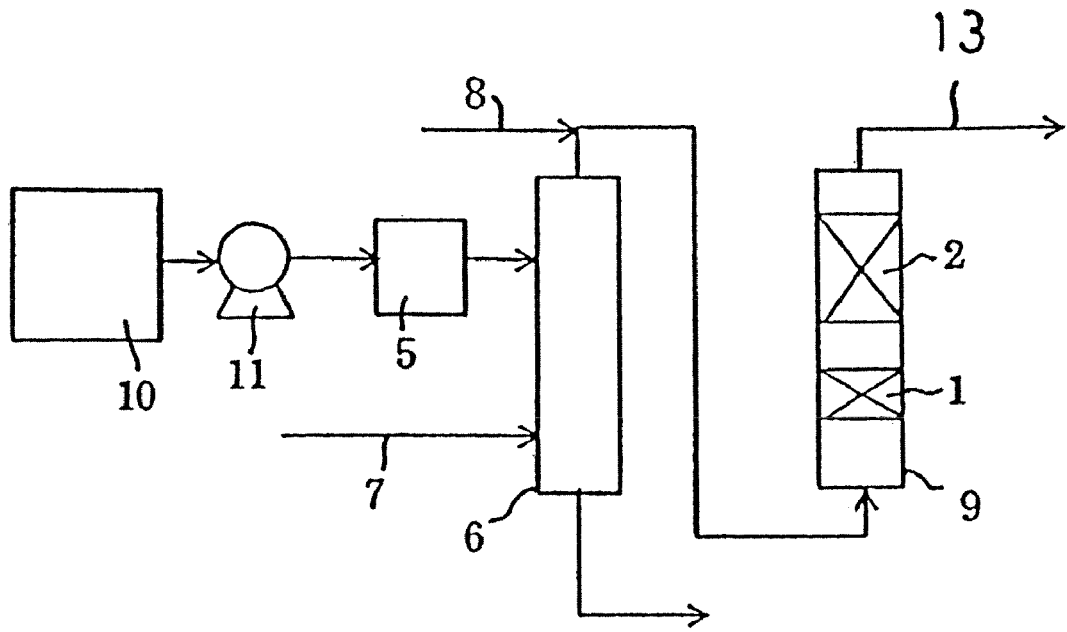
FIG. 4 is an explanatory diagram showing a basic configuration of another example of the present invention.
Figure 5:
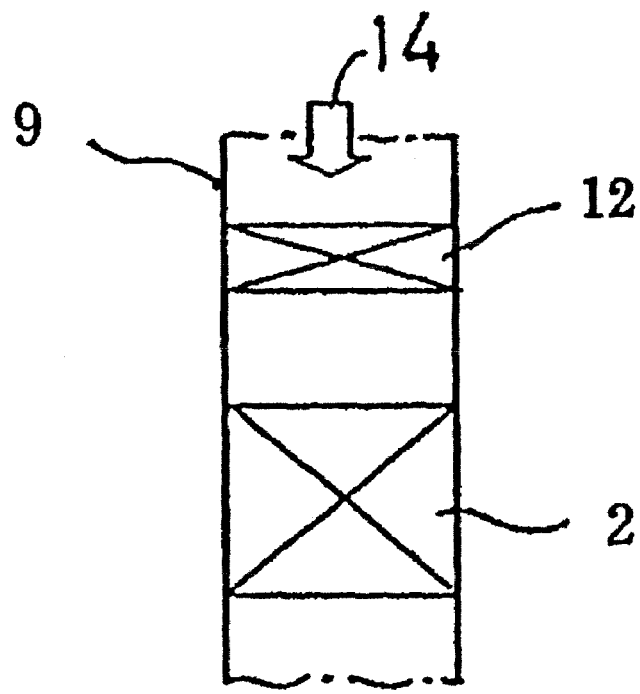
FIG. 5 is an explanatory diagram explaining the prior art.

FIG. 4 is a schematic diagram illustrating an example in which the present invention is applied to a treatment of waste water discharged from a semiconductor plant and the like. In FIG. 4, the system is principally composed of a neutralization tank 10 for $NH_3$-containing waste water, a preheater 5 and a stripping tower 6 connected to the neutralization tank 10 through a pump 11, a catalyst tower 9 disposed on the downstream side of the stripping tower 6, and a pre-treatment catalyst layer 1 and an $NH_3$ decomposition catalyst layer 2 which are disposed sequentially along the direction of the gas flow in the catalyst tower 9. Reference numeral 7 designates a carrier gas, and reference numeral 8 designates a diluent air.

In the constitution as described above, the $NH_3$-containing waste water first flows into the neutralization tank 10 in which the pH thereof is adjusted to be 7 or more by means of, for example, sodium hydroxide, then passes through the pump 11 and the preheater 5, and flows into the stripping tower 6 at a predetermined temperature. Thereafter, the ammonia is stripped to transfer to vapor phase. The gas containing the ammonia after stripping is diluted with air as necessary, and then, introduced into the catalyst tower 9 on the downstream side in which a part of $NH_3$ is converted into NOx in the pre-treatment catalyst layer 1, whereby the resultant gas having an $NH_3$ concentration suitable for the treatment in the $NH_3$ decomposition catalyst layer 2 is obtained. Then, the gas flows into the $NH_3$ decomposition catalyst 2 in which $NH_3$ is decomposed efficiently into $N_2$ and $H_2O$ by means of a balance of the denitration function and the function for oxidizing $NH_3$ to generate NO, and as a result, the gas is made to be harmless.

According to the present example, even if the waste water contains $NH_3$ of a high concentration, the $NH_3$ in the waste water may be transferred to a vapor phase, and then, made to be efficiently harmless. Furthermore, since a quantity consumed of diluent air and the like may be suppressed to the utmost in addition to downsizing of the system, whereby energy-saving of the whole system can be achieved.

In the following, specific examples of the present invention will be described.

EXAMPLE 1

With respect to 50 g of hydrogen-substituted type Mordenite powder (HSZ-650, $SiO_2/Al_2O_3$=23 manufactured by Tosoh Corporation), a prescribed amount of an aqueous solution of chloroplatinic acid ($HPtCl_6.6H_2O$) was added such that Pt was 0.5% in a weight ratio, the mixture was evaporated and dried, and then, the resulting product was calcined at 550° C. for 2 hours to obtain a Pt-Mordenite catalyst. The resulting catalyst was slurried with silica gel and water, a commercially available corrugated honeycomb support made of a silica-alumina fiber (Honeycle 3722 having 150 square and 20 length manufactured by NICHIAS Corporation) was coated with the resultant slurry, and then, a honeycomb-structured Pt Mordenite catalyst was obtained after applying air-drying for 2 hours, drying at 120° C. for 2 hours, and calcining at 500° C. for 2 hours. A Pt support amount of the present catalyst was 0.75 g/L. The catalyst was cut off in 25 mm width to obtain a catalyst flow path part of 25×150-20 L containing an $NH_3$ oxidation component. It is to be noted herein that an omitted unit in case of expressing a size of a catalyst is always "millimeter" in the specification, and the same is applied to the following respective examples.

On the other hand, the same corrugated honeycomb support on which no catalyst component had been supported was cut off into a belt shape of 25×150-20 L, whereby a catalyst flow path part containing no $NH_3$ oxidation component was obtained.

The above-described flow path part containing the oxidation component was alternately stacked with the flow path part not containing the oxidation component in six plies, and then, the outer periphery of the stacked parts was surrounded by a metallic frame to obtain a catalyst material for the pre-treatment of 150 square-20 L (corresponding to the catalyst material shown in FIG. 2(A)).

On one hand, an oxidation catalyst layer to be disposed on the downstream side of an exhaust gas treatment was manufactured as follows. To 1 liter of $1.33 \times 10^{-2}$ wt % of chloroplatinic acid ($H_2[PtCl_6] \cdot 6H_2O$) aqueous solution, 100 g of a fine silica powder (Micon F manufactured by Tomita Pharmaceutical Co., Ltd.) was added, the mixture was evaporated and dried on a sand bath, and the resultant product was calcined at 500° C. in air for 2 hours to prepare 0.05 wt % $Pt.SiO_2$, thereby obtaining a catalyst powder of a first component. Aside from this, 7.43 kg of ammonium paratungstate ($(NH_4)_{10}H_{10} \cdot W_{12}O_{46} \cdot 6H_2O$) and 3.0 kg of ammonium metavanadate were added to 46.7 kg of a titanium oxide powder (MCH manufactured by Ishihara Sangyo Kabushiki Kaisha Ltd.; $SO_4$ content: 3 wt %), the resultant mixture was kneaded by the use of a kneader, the resulting paste was granulated and then, dried, thereafter calcined at 550° C. for 2 hours. The resulting granules were pulverized to obtain a catalyst powder (Ti/W/V=91/5/4 (atomic ratio) of a second component. A corrugated honeycomb support made of an alumina-silica fiber (Honeycle 3722 having 150 square-100L manufactured by NICHIAS Corporation) was immersed into slurry obtained by suspending 2.0 kg of the resulting second component and 202 g of the first component into 306 kg of water, whereby the support was impregnated with the slurry. Thereafter, a liquid was drained off from the support by means of air blow, dried in atmosphere, and then, calcined at 500° C. for 2 hours to obtain an $NH_3$ decomposition catalyst layer to be disposed in the exhaust gas downstream part.

EXAMPLE 2

A pre-treatment catalyst layer was obtained in accordance with the same manner as that of the above described example 1 except that the preparing method for the catalyst layer for the pre-treatment of example 1 was changed as described hereinafter.

The same corrugated honeycomb material made of the silica-alumina fiber (150 square-20L) used in example 1 was impregnated with 30% $TiO_2$ sol (manufactured by Ishihara Sangyo Kabushiki Kaisha Ltd.), thereafter a liquid was drained off by means of air blow, and dried at 150° C. The resulting material was cut off into pieces each having 30 breadth, thereafter three pieces were impregnated with a dinitrodiamineplatinum solution (Pt concentration: 1.33 g/L), dried again, and these pieces were calcined at 600° C. together with the remaining two pieces. Both types of the resulting materials are alternately laminated with each other to obtain the catalyst layer for the pre-treatment.

EXAMPLE 3

A pre-treatment catalyst layer was obtained in accordance with the same manner as that of the above described example 1 except that the preparing method for the catalyst layer for the pre-treatment of example 1 was changed as described hereinafter.

A commercially available honeycomb support made of cordierite (manufactured by Hitachi Metals, Ltd.; cell number 300 cpsi, 150 square-20L) was impregnated with alumina sol (manufactured by Nissan Chemical Industries, Ltd.; $Al_2O_3$ content 20%), a liquid was drained off from the resultant material, dried, and calcined at 450° C. for 2 hours to obtain a support on which 30 g/L of $Al_2O_3$ was supported. A nitric acid solution of palladium nitrate (Pd concentration: 1 g/L) was poured into each single cell of the honeycomb material by the use of a dropper to prepare the support in which regions on each of which is supported with Pd and regions on each of which is not supported with Pd were made to be present in a staggered configuration as shown in FIG. 2(B). The resultant material was dried, and calcined at 600° C. for 2 hours to obtain the catalyst layer for the pre-treatment. A Pd support amount in the Pd support regions in the present catalyst was about 2 g/L.

EXAMPLE 4

A pre-treatment catalyst layer was obtained in accordance with the same manner as that of the above described example 2 except that the dinitrodiamineplatinum solution used in the preparation method of the catalyst layer for the pre-treatment in example 2 was replaced by a rhodium nitrate (Rh concentration: 0.65 g/L) solution. A Rh support amount in the Rh support regions in the present catalyst was about 1 g/L.

Comparative Examples 1 to 4

Catalyst layers of comparative examples 1 to 4 were prepared in accordance with the same manner as that of the above-described respective examples except that the pre-treatment catalyst layers in the examples 1 to 4 were replaced by noble metal support catalysts of each 150 square-20L size which was prepared by such a manner that each material was supported entirely with each of the noble metal components in the pre-treatment catalysts.

Each of the pre-treatment catalyst materials obtained in the examples 1 to 4 and the comparative examples 1 to 4 was disposed along the gas flowing direction of a reactor on the upstream side, while the flow path on the downstream side was filled with the $NH_3$ decomposition catalyst prepared in the example 1, a gas ($NH_3$: 3%, water vapor: 12%, the remainder: air) heated to 200° C. or 300° C. was supplied at 50 m$^3$/h from the inlet of the reactor on the pre-treatment catalyst side, and concentrations of the remaining $NH_3$ and NO were measured in the outlet of the reactor. Reactor inlet temperatures, reactor outlet $NH_3$ concentrations and NO concentrations measured were shown in table 1.

TABLE 1

| Treatment Manner | Reactor Inlet Outlet (0° C.) | Concentration in Reactor Temperature (ppm) | |
|---|---|---|---|
| | | NH3 | NO |
| Example 1 | 200 | 2 | 0.1 |
| Example 2 | 200 | 4 | 0.1 |
| Example 3 | 300 | 5 | 5 |
| Example 4 | 300 | 3 | 4 |
| Comp. Ex. 1 | 200 | 1 or less | 8000 |
| Comp. Ex. 2 | 200 | 1 or less | 12000 |

TABLE 1-continued

| Treatment Manner | Reactor Inlet Outlet (0° C.) | Concentration in Reactor Temperature (ppm) | |
| --- | --- | --- | --- |
| | | NH3 | NO |
| Comp. Ex. 3 | 300 | 1 or less | 9000 |
| Comp. Ex. 4 | 300 | 1 or less | 14000 |

As is apparent from table 1, scarce $NH_3$ was detected in the outlet of the reactor in any of the comparative examples 1 to 4, and production of a large quantity of NO was observed. On the contrary, both the concentrations of $NH_3$ and NO were treated so as to be 5 ppm or less in the examples 1 to 4. Accordingly, it has been found that the $NH_3$ can be decomposed and processed efficiently without by-producing a large quantity of NOx in accordance with the present invention in which the pre-treatment catalyst is used.

INDUSTRIAL APPLICABILITY

There is a tendency to tighten regulations as to $NH_3$ in exhaust gases and waste water, so that it is considered that there will be more and more needs for an $NH_3$ decomposition technology. In these circumstances, the present invention can expand remarkably an $NH_3$ concentration range which may be treated with the multi-functional catalyst ($NH_3$ decomposition catalyst), so that the invention may practice on an $NH_3$-containing gas of a high concentration to which an application of a conventional multi-functional catalyst has been considered to be impossible, or required to apply such pre-treatment that the high concentration had been beforehand reduced by the use of a large quantity of diluent gas; as a result of only an addition of a small amount of the pre-treatment catalyst. Therefore, the present invention can serve the above-described needs, and hence, the invention provides a technology with future potential.

The invention claimed is:

1. In a method for treating an $NH_3$-containing gas wherein a gas containing an ammonia ($NH_3$) of a high concentration is allowed to pass through a pre-treatment catalyst layer having a function for oxidizing $NH_3$ to generate nitrogen monoxide (NO), and then pass through a denitration catalyst layer having in combination, a denitration function and a function for oxidizing $NH_3$ to generate NO, which contains titanium oxide ($TiO_2$); an oxide of at least one selected from the group consisting of vanadium (V), tungsten (W), molybdenum (Mo), zeolite, titania, alumina, and zirconia supported with platinum (Pt), and combinations thereof; a method for preventing thermal deterioration of the catalyst of the denitration catalyst layer, characterized by disposing a catalyst layer not having the function for oxidizing $NH_3$ to generate NO in the pre-treatment catalyst layer in parallel thereto.

2. The method according to claim 1, wherein a part of a flow path section of the pre-treatment catalyst layer is composed of a catalyst layer containing an $NH_3$ oxidation active component selected from the group consisting of zeolite, silica, titania, zirconia, and alumina supported with at least one selected from the group consisting of platinum (Pt), palladium (Pd), and rhodium (Rh) and combinations thereof; and another part of the flow path section is composed of a catalyst layer not containing the $NH_3$ oxidation active component in the pre-treatment catalyst layer.

3. The method according to claim 2, wherein a feed amount of the $NH_3$-containing gas to the flow path of the catalyst layer having the function for oxidizing $NH_3$ to generate NO in the pre-treatment catalyst and another flow path not having the former function is controlled in such that an $NH_3$ concentration in the gas treated in the pre-treatment catalyst layer is higher than a NOx concentration.

4. The method according to claim 2, wherein the gas containing the $NH_3$ of the high concentration contains 3% of $NH_3$.

5. The method according to claim 1, wherein a feed amount of the $NH_3$-containing gas to the flow path of the catalyst layer having the function for oxidizing $NH_3$ to generate NO in the pre-treatment catalyst and another flow path not having the former function is controlled in such that an $NH_3$ concentration in the gas treated in the pre-treatment catalyst layer is higher than a NOx concentration.

6. The method according to claim 5, wherein the gas containing the $NH_3$ of the high concentration contains 3% of $NH_3$.

7. The method according to claim 1, wherein the gas containing the $NH_3$ of the high concentration contains 3% of $NH_3$.

8. An apparatus for treating an $NH_3$-containing gas while preventing thermal deterioration of a catalyst, wherein a pre-treatment catalyst layer having a function for oxidizing $NH_3$ to generate carbon monoxide (NO), and a catalyst layer having a denitration function in combination with another function for oxidizing $NH_3$ to generate NO, which contains titanium ($TiO_2$); an oxide of at least one selected from the group consisting of vanadium (V), tungsten (W), and combinations thereof, are sequentially disposed in a flow path section of a gas containing ammonia ($NH_3$) along the gas flow direction, characterized in that a part of the flow path section is composed of a catalyst layer containing an $NH_3$ oxidation active component selected from the group consisting of zeolite, silica, titania, zirconia and alumina supported with at least one selected from the group consisting of platinum (Pt), palladium (Pd), and rhodium (Rh) and combinations thereof; and another part of the flow path section is composed of a catalyst layer not containing the $NH_3$ oxidation active component in the pre-treatment catalyst layer.

9. The apparatus according to claim 8, wherein a ratio of the catalyst layer containing the $NH_3$ oxidation active component to the catalyst layer not containing the oxidation component is decided in the pre-treatment catalyst layer such that the $NH_3$ concentration is higher than a NOx concentration in the outlet gas of the pre-treatment catalyst layer.

* * * * *